(12) United States Patent
Krasny et al.

(10) Patent No.: US 7,623,596 B2
(45) Date of Patent: Nov. 24, 2009

(54) METHODS AND SYSTEMS FOR ESTIMATING A CHANNEL RESPONSE BY APPLYING BIAS TO AN INITIAL CHANNEL ESTIMATE

(75) Inventors: Leonid Krasny, Cary, NC (US); Dennis Hui, Cary, NC (US)

(73) Assignee: Ericsson, Inc., Plano, TX (US)

( * ) Notice: Subject to any disclaimer, the term of this patent is extended or adjusted under 35 U.S.C. 154(b) by 646 days.

(21) Appl. No.: 10/608,274

(22) Filed: Jun. 27, 2003

(65) Prior Publication Data

US 2004/0264603 A1    Dec. 30, 2004

(51) Int. Cl.
*H04L 27/06*    (2006.01)

(52) U.S. Cl. ........................................... 375/340

(58) Field of Classification Search .................. 375/260, 375/316, 340, 342, 346, 350, 130; 455/67.11
See application file for complete search history.

(56) References Cited

U.S. PATENT DOCUMENTS

| | | | |
|---|---|---|---|
| 5,778,336 A | 7/1998 | Chou et al. | |
| 5,872,816 A | 2/1999 | Parr et al. | |
| 5,937,377 A * | 8/1999 | Hardiman et al. | ........... 704/225 |
| 6,049,510 A | 4/2000 | Claassen | |
| 6,163,571 A | 12/2000 | Asokan et al. | |
| 6,269,131 B1 * | 7/2001 | Gothe et al. | ................ 375/346 |
| 6,370,205 B1 | 4/2002 | Lindoff et al. | |
| 6,628,926 B1 * | 9/2003 | van de Beek et al. | ......... 455/75 |
| 6,700,919 B1 * | 3/2004 | Papasakellariou | ........... 375/130 |
| 7,035,353 B2 * | 4/2006 | Fimoff et al. | ................ 375/340 |
| 2003/0043893 A1 | 3/2003 | Jard et al. | |
| 2003/0076904 A1 * | 4/2003 | Magee | ........................ 375/340 |
| 2003/0081695 A1 * | 5/2003 | Eilts et al. | .................... 375/316 |
| 2004/0005010 A1 * | 1/2004 | He et al. | ..................... 375/260 |
| 2004/0013212 A1 | 1/2004 | Benesty et al. | |
| 2004/0076239 A1 * | 4/2004 | Yu et al. | ..................... 375/260 |
| 2005/0170783 A1 * | 8/2005 | Krishnan et al. | ......... 455/67.11 |

FOREIGN PATENT DOCUMENTS

| | | |
|---|---|---|
| EP | 0 999 651 A2 | 5/2000 |
| WO | WO 01/06683 A1 | 1/2001 |
| WO | WO 02/31996 A2 | 4/2002 |

OTHER PUBLICATIONS

Standard Search Report, File No. RS 109963 US, Mar. 5, 2004.
Cedervall et al., *Structured Methods for Blind Multi-Channel Identification*, IEEE International Conference on Digital Signal Processing, Jul. 2-4, 1997, pp. 387-390.
Harada, OCDM: *A New Multicode CDM Radio Transmission System Based on Cyclic Modified M-Sequences—Performance Evaluation Using Prototype* -, IEEE Vehicular Technology Conference, May 16-20, 1999, pp. 1819-1825.

(Continued)

*Primary Examiner*—Don N Vo

(57) ABSTRACT

A channel response may be estimated from training symbols that are received over a channel, by determining an initial channel estimate from the training symbols and applying bias to the initial channel estimate to obtain a biased channel estimate. The biased channel estimate may then be used to demodulate a signal that is received over the channel.

24 Claims, 4 Drawing Sheets

OTHER PUBLICATIONS

Kubin et al., *Frequency-Domain Bias Decomposition for LMS and LS Adaptive Filters*, IEEE International Conference on Acoustics, Speech, and Signal Processing, Apr. 27-30, 1993, pp. 531-534.

Martone, *Optimally Regularized Channel Tracking Techniques for Sequence Estimation Based on Cross-Validated Subspace Signal Processing*, IEEE Transactions on Communications, vol. 48, No. 1, Jan. 2000, pp. 95-105.

International Search Report for PCT/US2004/019059; Date of Mailing Dec. 6, 2004.

* cited by examiner

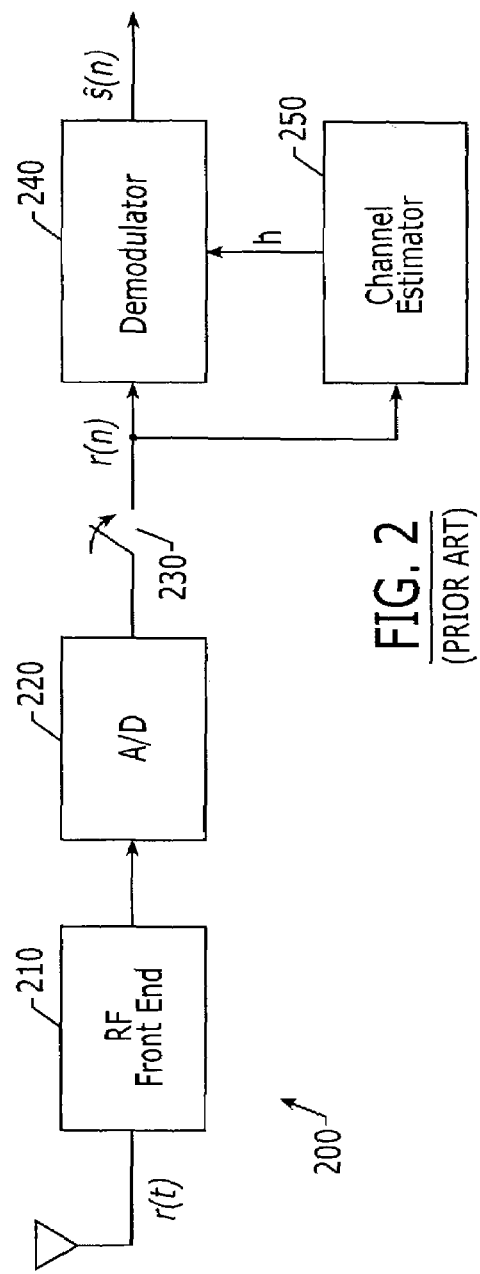

METHODS AND SYSTEMS FOR ESTIMATING A CHANNEL RESPONSE BY APPLYING BIAS TO AN INITIAL CHANNEL ESTIMATE

BACKGROUND OF THE INVENTION

This invention relates to digital communications systems and methods, and more particularly to systems and methods for estimating a channel response from training symbols that are received over a channel.

Digital communications systems and methods are widely used for voice, image and/or data communications. As is well known to those having skill in the art, when communicating wirelessly, the time-varying multipath fading of wireless channels may make reliable transmission difficult. In efforts to reduce the effect of such time-varying channels, it is known to transmit a sequence of training symbols, which are known to both the transmitter and the receiver. The known training symbols may be provided within each burst or selected bursts of transmitted symbols, along with the payload symbols that are unknown to the receiver. Based on these known training symbols, a channel response may be estimated. The channel estimate can then be used to demodulate the unknown payload symbols.

SUMMARY OF THE INVENTION

A channel response may be estimated from training symbols that are received over a channel, according to some embodiments of the present invention, by determining an initial channel estimate from the training symbols that are received over the channel, and adding bias to the initial channel estimate to obtain a biased channel estimate. The biased channel estimate may then be used to demodulate a signal that is received over the channel. In some embodiments, bias is added by transforming the initial channel estimate according to a transform matrix, setting at least one tap of the transformed initial channel estimate to zero, and inverse transforming the transformed initial channel estimate with at least one tap set to zero, to obtain the biased channel estimate. The transforming, setting at least one tap and inverse transforming may be repeatedly performed.

Accordingly, some embodiments of the present invention can add bias to an initial channel estimate to obtain a biased channel estimate that reduces error in the estimated channel response compared to the initial channel estimate. It will be understood that, although the above description has focused primarily on methods of estimating a channel response, analogous systems and wireless receivers that employ similar techniques to estimate any other parameters also may be provided.

BRIEF DESCRIPTION OF THE DRAWINGS

FIG. 1 illustrates a conventional format of a burst of transmitted symbols in a conventional GSM/EDGE system.

FIG. 2 is a block diagram of a conventional wireless receiver.

DETAILED DESCRIPTION

Figure 3:
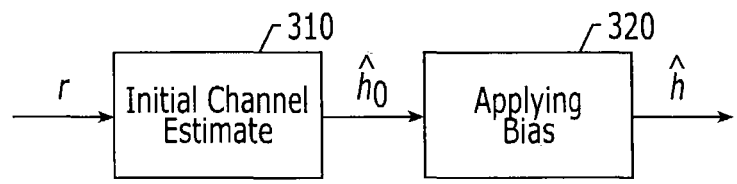
FIG. 3 is a block diagram of systems, methods and receivers for estimating a channel response from training symbols that are received over a channel according to some embodiments of the present invention.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In order to provide a thorough and complete description, an overview on the use of training sequences to estimate a channel response will be provided, and specific examples of DC offset, joint demodulation and transmit diversity then will be described. Embodiments of the present invention then will generally be described. A detailed description will then be provided along with a description of application of embodiments of the present invention in the above-described examples.

Overview

As was described above, time-varying multipath fading and/or other properties of the channel may make reliable receiving difficult in a wireless communication system. To reduce the effect of such time-varying channels, a sequence of training symbols, known to both the transmitter and the receiver, is often transmitted, within some or each burst of transmitted symbols, along with the data or payload symbols that are unknown to the receiver. Based on these known training symbols, the channel response corresponding to the present burst is estimated, and such a channel estimate is then used for demodulating the unknown data symbols. As an example, a conventional format of a burst of transmitted symbols in a conventional Global System for Mobile Communications (GSM)/Enhanced Data for GSM Evolution (EDGE) system is shown in FIG. 1. In FIG. 1, the numbers in parentheses denote the number of symbols in each segment.

A block diagram of a conventional wireless receiver is shown in FIG. 2. As shown in FIG. 2, the wireless receiver 200 includes a radio frequency (RF) front end 210, an analog-to-digital (A/D) converter 220 and a sampler 230. A demodulator 240 produces estimates of transmitted data symbols, denoted by ŝ(n), using a channel estimate h that is obtained by a channel estimator 250 using the known training symbols.

It is known that the performance of channel estimation techniques over the known training symbols may depend heavily on the choice of the training sequence. Even the best and the most sophisticated method of channel estimation may still result in an inaccurate channel estimate if the training sequence is not designed properly for the specific application on hand. A description of three examples where this might happen will now be provided.

First, the training-sequence selection process might not have taken into account specific implementation impairments caused by certain receiver architectures. For example, certain receiver structures may induce a DC offset in the received signal. Channel estimation may incorporate the estimation of such a DC offset into the channel estimation. However, the selected training sequences may not work well with the estimation of a DC offset.

The second example may happen when receivers employ new, advanced signal processing techniques that may not have been foreseen during the development of an existing communication system. For example, a receiver may attempt to jointly demodulate a desired signal and a dominant interfering signal that may come from a base station of an adjacent cell in a cellular system. It is known that in a heavily loaded cellular system, receivers are often affected by a single dominant interfering signal. Consequently, the ability of a receiver to jointly demodulate desired and interfering signals can significantly improve its performance. To perform joint demodulation, a receiver may estimate the channel for the desired signal as well as that for the interfering signal over the training period. However, the training sequence used by two adjacent base stations may not necessarily have good cross correlation, which may be desirable for conventional channel estimation techniques.

The third example is that no "good enough" training sequence may exist at all for the specific applications. This may be caused by the length of the training sequence in the pre-defined burst format (26 in GSM/EDGE burst format of FIG. 1) being too short and/or the size of the alphabet of the training symbols being too small (e.g. 2 in GSM). For example, the use of transmit antenna diversity (also referred to as transmit diversity), where two or more antennas are used to transmit signals simultaneously, can be an effective way of improving the multipath fading channels. In transmit diversity, if the channel experienced by one of the transmit antenna fades down, the desired signal may still be recovered at the destination from the signal replica transmitted on the other antenna(s). Consequently, the probability of experiencing a complete signal outage due to multipath fading can be significantly reduced. However, to achieve this goal, the channel from each of the transmit antennas should be estimated from the received signal. To facilitate the estimation of these multiple channel responses, different training sequences with good cross-correlation properties among each other may be transmitted on different antennas. However, as the number of transmit antennas increases, it may be increasingly difficult to find a proper set of training sequences.

A mathematical treatment of the three examples mentioned above, namely, DC offset, joint demodulation, and transmit diversity, within the context of an EDGE system, now will be provided. These examples will be referred to below after describing embodiments of the present invention.

As to DC offset, consider the baseband received signal with an unknown DC offset given below:

$$r(n) = \sum_{k=0}^{L-1} h_1(k) s_1(n-k) + d e^{-j3n\pi/8} + w(n) \quad n = L-1, \tag{1}$$
$$L, \ldots, N-1,$$

where $d$ denotes the DC offset, $\{h_1(k)\}_{k=0}^{L-1}$ denotes the channel response to be estimated, $\{s_1(n)\}_{n=0}^{N-1}$ denotes the training symbols, $N=26$ is the length of the training symbols, and $\{w(n)\}$ denotes a white Gaussian noise process with variance $\sigma_w^2$. Note that the term $\exp\{-j3n\pi/8\}$ shown in (1) comes from the $3\pi/8$ rotation imposed on the transmitted signals of EDGE systems for the purpose of blind modulation detection. In matrix form, Equation (1) can be written as $$r = \underbrace{[S_1 \; a]}_{s} \underbrace{\begin{bmatrix} h_1 \\ d \end{bmatrix}}_{h} + w, \tag{2}$$

where $r = (r(L-1), r(L), \ldots, r(N-1))^T$, $h_1 = (h_1(0), h_1(1), \ldots, h_1(L))^T$, and $w = (w(L), w(L+1), \ldots, w(N))^T$, $$S_1 = \begin{pmatrix} s_1(L-1) & s_1(L-2) & \cdots & s_1(0) \\ s_1(L) & s_1(L-1) & \cdots & s_1(1) \\ \vdots & & & \vdots \\ s_1(N-1) & s_1(N-2) & \cdots & s_1(N-L) \end{pmatrix} \text{ and}$$

$$a = \begin{pmatrix} 1 \\ e^{-j3\pi/8} \\ e^{-j(3\pi/8)2} \\ \vdots \\ e^{-j(3\pi/8)(N-L)} \end{pmatrix}.$$

One technique for estimating the channel $h_1$ is to jointly estimate the vector $h = (h_1^T, d)^T$ given the received signal vector $r$, and then take the first $L$ components of the resulting estimate $\hat{h}$ as an estimate of $h_1$. To facilitate such a joint DC and channel estimation, the training sequence $\{s_1(n)\}_{n=0}^{N-1}$ should be designed such that the columns of $S_1$ are mutually orthogonal and are individually orthogonal to the vector $a$, or equivalently, that the columns of the combined matrix $S$ are mutually orthogonal to each other. However, the training sequences are often designed only to make the columns of $S_1$ to be mutually orthogonal. For instance, the columns of the matrix $S_1$ that correspond to the existing training sequences used in GSM/EDGE systems are not orthogonal to the vector $a$.

As to joint demodulation, in a receiver that jointly demodulates a desired signal and an interfering signal, the received baseband signal is modeled as $$r(n) = \sum_{i=0}^{L-1} h_1(i) s_1(n-i) + \sum_{i=0}^{L-1} h_2(i) s_2(n-i) + w(n), \tag{3}$$

for $n = L-1, L, \ldots, N-1$, where $\{h_1(i)\}_{i=0}^{L-1}$ and $\{h_2(i)\}_{i=0}^{L-1}$ denotes the channel response of the desired and interfering signal, respectively, (for simplicity, both channels are assumed to have length L), and $\{w(n)\}$ denotes a white Gaussian noise process with variance $\sigma_w^2$. In matrix form, the received signal $r(n)$ over the training symbols can be expressed as $$r = [S_1 \; S_2] \begin{bmatrix} h_1 \\ h_2 \end{bmatrix}, \tag{4}$$

where $r=(r(L-1), r(L), \ldots, r(N-1))^T$, $h_1=(h_1(0), h_1(1), \ldots, h_1(L))^T$, $h_2=(h_2(0), h_2(1), \ldots, h_2(L))^T$, $w=(w(L-1), w(L), \ldots, w(N-1))^T$, $$S_1 = \begin{pmatrix} s_1(L-1) & s_1(L-2) & \cdots & s_1(0) \\ s_1(L) & s_1(L-1) & \cdots & s_1(1) \\ \vdots & & & \vdots \\ s_1(N-1) & s_1(N-2) & \cdots & s_1(N-L) \end{pmatrix} \text{ and}$$

$$S_2 = \begin{pmatrix} s_2(L-1) & s_2(L-2) & \cdots & s_2(0) \\ s_2(L) & s_2(L-1) & \cdots & s_2(1) \\ \vdots & & & \vdots \\ s_2(N-1) & s_2(N-2) & \cdots & s_2(N-L) \end{pmatrix}.$$

One technique for estimating the channels $h_1$ and $h_2$ is to jointly estimate both of them given the received signal vector r. To facilitate such a joint channel estimation, the training sequences $\{s_1(n)\}_{n=1}^{L-1}$ and $\{s_2(n)\}_{n=1}^{L-1}$ from adjacent base stations should be designed such that the columns of $S \equiv [S_1, S_2]$ are mutually orthogonal. However, there is no guarantee that such a property will hold in existing cellular systems, such as GSM systems.

Finally, as to transmit diversity, in a communication system employing transmit diversity with $n_T$ transmit antenna, the received baseband signal is given by $$r(n) = \sum_{k=1}^{n_T} \sum_{i=0}^{L-1} h_k(i) s_k(n-i) + w(n), \quad (5)$$

for $n=L-1, L, \ldots, N-1$, where $\{h_k(i)\}_{i=0}^{L-1}$ denotes the channel response of length L from the transmit antenna k, and $\{w(n)\}$ denotes a white Gaussian noise process with variance $\sigma_w^2$. In matrix form, the received signal r(n) over the training symbols can be expressed as $$r = \underbrace{[S_1 \ S_2 \ \ldots \ S_{n_T}]}_{S} \underbrace{\begin{bmatrix} h_1 \\ h_2 \\ \vdots \\ h_{n_T} \end{bmatrix}}_{h} + w, \quad (6)$$

where $r=(r(L-1), r(L), \ldots, r(N-1))^T$, $h_k=(h_k(0), h_k(1), \ldots, h_k(L))^T$, $w=(w(L-1), w(L), \ldots, w(N-1))^T$, $$S_k = \begin{pmatrix} s_k(L-1) & s_k(L-2) & \cdots & s_k(0) \\ s_k(L) & s_k(L-1) & \cdots & s_k(1) \\ \vdots & & & \vdots \\ s_k(N-1) & s_k(N-2) & \cdots & s_k(N-L) \end{pmatrix}.$$

One technique for estimating the channels $\{h_k\}_{k=1}^{n_T}$ is to jointly estimate the vector h given the received signal vector r. To facilitate such a joint channel estimation, the training sequences $\{s_k\}_{k=1}^{n_T}$ should be designed such that the columns of $S \equiv [S_1, S_2, \ldots, S_{n_T}]$ are mutually orthogonal. However, if the length of the training sequences and/or the size of their alphabet are not large enough, there may not exist any set of training sequences with, or close to having, such a property.

Note that the received signals in matrix form (Equations (2) and (6)) for both the example of DC offset and the examples of transmit diversity (or the combination of both) can be formulated in the following general form:

$$r = Sh + w, \quad (7)$$

where w is a Gaussian-distributed noise vector. In channel estimation, it is desired to estimate the vector h given the received signal r. Embodiments of the invention can improve the estimation of h over conventional estimation methods when the columns of the matrix S are not mutually orthogonal to each other. For simplicity, the noise vector w is assumed to be white in the following descriptions. However, one or ordinary skill in the art can generalize to the case when the noise vector w has non-white statistics.

General Description

Embodiments of the present invention can provide systems, methods and receivers that systematically add bias to the channel estimate that will result in a smaller overall estimation error than, say, the conventional channel estimation methods, which may compute a non-biased channel estimate. It can be shown that by trading off bias with the statistical error caused by the additive noise process, according to the characteristics of the matrix S in some embodiments of the invention, overall estimation error can be significantly reduced. More precisely, consider the overall mean squared estimation error, which can be expressed as sum of two terms:

$$tr\left[E(h-\hat{h})(h-\hat{h})^H\right] = \underbrace{tr\left[(h-E\hat{h})(h-E\hat{h})^H\right]}_{Bias} + \underbrace{tr\left[E(\hat{h}-E\hat{h})(\hat{h}-E\hat{h})^H\right]}_{Statistical\ Error} \quad (8)$$

Some embodiments of the invention can compute an estimate ĥ which can provide a good tradeoff between the two terms in (8).

FIG. 3 is a block diagram of systems, methods and receivers for estimating a channel response from training symbols that are received over a channel according to some embodiments of the present invention. These embodiments may be used, for example, in the channel estimator 250 of FIG. 2. As shown in FIG. 3 at Block 310, an initial channel estimating circuit is configured to determine an initial channel estimate $\hat{h}_0$ from the training symbols r that are received. Conventional channel estimation techniques may be used. At Block 320, a bias applying circuit is configured to apply a bias to the initial channel estimate $\hat{h}_0$, to obtain a biased channel estimate ĥ.

Figure 4:
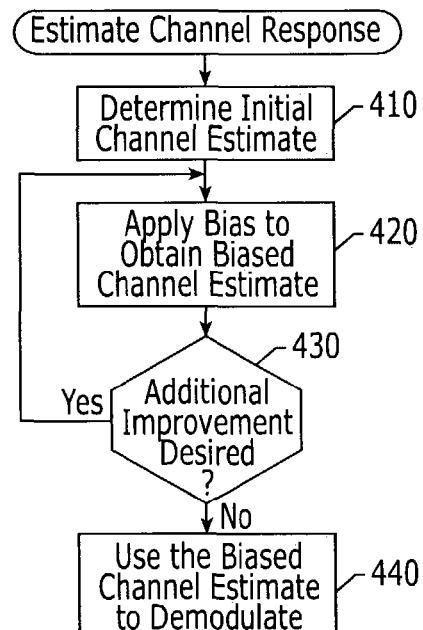
FIG. 4 is a flowchart of operations that may be performed to estimate a channel response according to other embodiments of the present invention.

FIG. 4 is a flowchart of operations that may be performed to estimate a channel response according to other embodiments of the present invention. These operations may be used, for example, by the channel estimator 250 of FIG. 2.

As shown in FIG. 4 at Block 410, an initial channel estimate is determined from the training symbols that are received, for example using conventional techniques. At Block 420, bias is added to obtain a biased channel estimate. At Block 430, a test is made as to whether additional improvement is desired and, if so, operations at Block 420 may be repeatedly performed until a desired improvement is obtained. Once obtained, at Block 440, the biased channel estimate is used to demodulate a signal that is received over the channel.

A common technique for estimating h in (7) is the least squares (LS) channel estimation. The LS estimate of h given r is $$\hat{h}_{LS} = (S^H S)^{-1} S^H r, \quad (9)$$

which is known to be an unbiased estimate of the true channel h, i.e. $E\hat{h}_{LS} = h$. In effect, such an estimate constrains the bias, as shown in the first term in (8), to be zero and then minimizes the statistical error, as shown in the second term in (8), for the given matrix S. However, when the matrix S does not have mutually orthogonal columns, by allowing a non-zero bias, the statistical error can be much further reduced.

Figure 5:
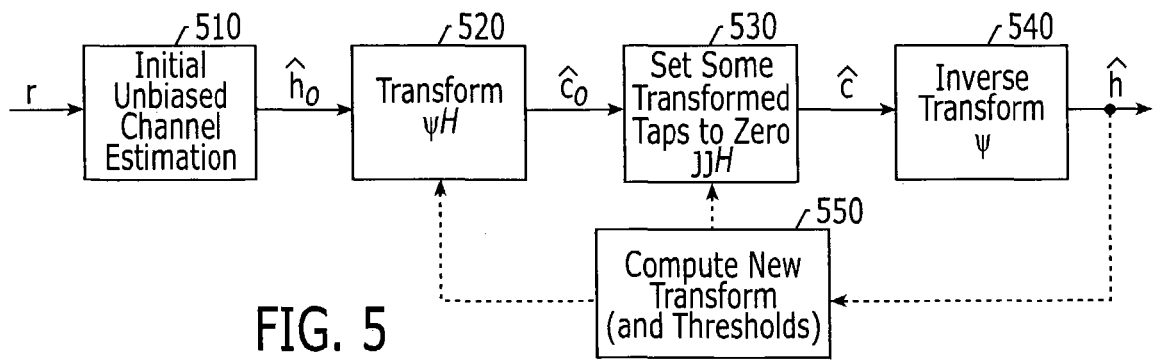
FIG. 5 is a block diagram of other embodiments of the present invention.

FIG. 5 is a block diagram of other embodiments of the present invention. In these embodiments, the receiver first performs an initial unbiased channel estimation, for example the LS channel estimation described in (9), at Block 510. Then, at Block 520, a circuit is configured to transform the initial channel estimate. For example, the resulting channel estimate $\hat{h}_o$ is transformed according to a pre-computed orthogonal matrix $\Psi$ at Block 520. In some embodiments, the matrix $\Psi$ has the eigenvectors of (a) the matrix $S^H S$ or (b) the matrix $(\hat{h}_o \hat{h}_o^H - \sigma_w^2 (S^H S)^{-1})$ as columns, where the noise power $\sigma_w^2$ may be obtained from the initial channel estimation. At Block 530, a circuit is configured to perform an operation on the transformed channel estimate to change at least one of its values. In some embodiments, at Block 530, all but K taps (where K<L) of the transformed channel estimate $\hat{c}_o$ are set to zero according to certain selection criteria. At Block 540, a circuit is configured to inverse transform the transformed initial channel estimate on which the operation was performed. For example, the channel estimate $\hat{h}$ (after the first iteration) is obtained by inverse transforming the resulting estimate $\hat{c}$ at Block 540.

In some embodiments, the number K may be predetermined according to the distribution of eigenvalues of the matrix $S^H S$ and stored in the receivers. In these embodiments, all taps of $\hat{c}_o$ but those corresponding to the K largest eigenvalues of $S^H S$ are set to zero. In other embodiments, K may be selected to be the number of positive eigenvalues of the matrix $(\hat{h}_o \hat{h}_o^H - \sigma_w^2 (S^H S)^{-1})$. These embodiments can be equivalent to selecting K by comparing each individual element of the transformed channel estimate $\hat{c}_o$ to at least one threshold and then setting K to be the number of elements that are greater than the corresponding thresholds. More precisely, the i-th threshold for the i-th tap of $\hat{c}_o$ to compare may be given by $$\gamma_i = \frac{\sigma_w^2}{[\Psi^H (S^H S) \Psi]_{ii}}$$

where $[A]_{ii}$ denotes the i-th diagonal element of the matrix A, and the columns of $\Psi$ here are the eigenvectors of the matrix $(\hat{h}_o \hat{h}_o^H - \sigma_w^2 (S^H S)^{-1})$.

For example, when the LS channel estimation in (9) is employed as the initial channel estimation $\hat{h}_o$, the new channel estimate $\hat{h}$ is given by:

$$\hat{h} = \Psi_K \Psi_K^H \hat{h}_o = \Psi_K \Psi_K^H (S^H S)^{-1} S^H r. \quad (10)$$

where $\Psi_K$ denotes a L by K matrix, whose columns are mutually orthogonal to each other and may be chosen as (a) the K eigenvectors of the matrix $S^H S$ with the largest eigenvalues, or as (b) those eigenvectors of the matrix $(\hat{h}_o \hat{h}_o^H - \sigma_w^2 (S^H S)^{-1})$ that have positive eigenvalues. If K=L, i.e. all taps of the transformed channel estimate $\hat{c}_o$ are preserved, the estimate in (10) reduces to the ordinary LS channel estimate described in (9).

FIG. 5 also includes an optional feedback loop 550 according to other embodiments of the invention, where the channel estimate $\hat{h}$ from the first iteration is used to compute a new transform $\Psi$, which is then applied to the initial channel estimate $\hat{h}_o$ again. A new value of K or a set of new thresholds to which the elements of $\hat{c}_o$ are compared may also be updated. In some embodiments, the new transform is computed using the eigenvectors of the matrix $(\hat{h} \hat{h}^H - \sigma_w^2 (S^H S)^{-1})$ as the columns. More than two iterations may be executed through the feedback loop to further improve the final channel estimate $\hat{h}$.

Figure 6:
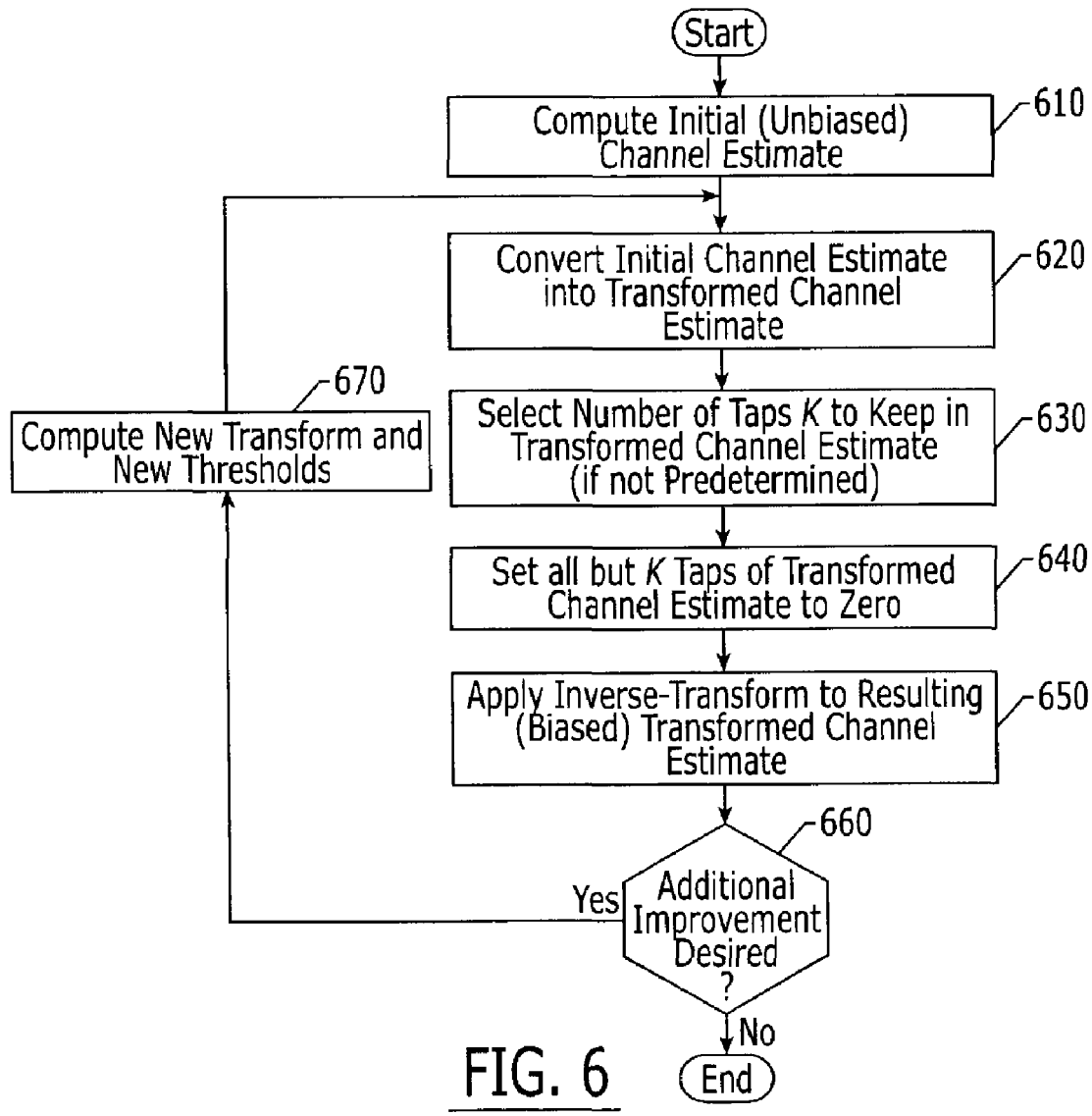
FIG. 6 is a flowchart of operations that may be performed according to other embodiments of the present invention.

FIG. 6 is a flowchart of operations that may be performed according to other embodiments of the present invention. As shown in FIG. 6, an initial unbiased channel estimate is computed at Block 610. At Block 620, the initial channel estimate is converted into a transformed channel estimate. At Block 630, a number of taps K to keep in the transformed channel estimate is selected if this number is not predetermined. At Block 640, all but K-taps of the transformed channel estimate are set to 0. At Block 650, the inverse transform is applied to the resulting bias transformed channel estimate. At Block 660, if additional improvement is desired, then at Block 670 the new transform and new thresholds are computed if desired.

In still other embodiments of the invention, at Blocks 530 or 640, K-taps are set to 0 and the remaining taps are kept. In these embodiments, the new channel estimate may be subtracted from the initial channel estimate rather than being added thereto at Block 330 of FIG. 3.

Detailed Explanation

A detailed explanation of introducing intentional bias into an initial channel-estimate in order to reduce the overall estimation error, according to some embodiments of the present invention, now will be provided. It will be shown that when no a priori information about the true channel h is known, the channel estimate in (10) that resulted from the choice of the columns of $\Psi_K$ being (a) the K eigenvectors of the matrix $S^H S$ with the largest eigenvalues or (b) the eigenvectors of the matrix $(\hat{h}_o \hat{h}_o^H - \sigma_w^2 (S^H S)^{-1})$ with positive eigenvalues, gives a good tradeoff between the bias and the statistical error as shown in (8) for any K<L.

Let $\Psi$ be the unitary matrix in FIG. 5, let $c = (c_1, c_2, \ldots, c_L)^T = \Psi^H h$ (or equivalently $h = \Psi c$) and let $\hat{c} = (\hat{c}_1, \hat{c}_2, \ldots, \hat{c}_L)^T = \Psi^H \hat{h}$. Also let $I = \{i_1, i_2, \ldots, i_K\}$ be a set of integers such that $1 \leq i_1 < i_2 < \ldots < i_K \leq N$, which will be determined later. Corresponding to any given I, let J(I) (or just J) denote an L by K matrix with the $(i_k, k)$ element being one, where $k = 1, 2, \ldots, K$, and with all other elements being zero. Note that multiplying a channel estimate $\hat{c}_o$ by $JJ^H$ is the same as setting all taps whose indices are not in I to zero.

A formula of the overall estimation error defined in (8) for embodiments of the invention depicted in FIG. 5 will be described. Then, the estimation error can be minimized over integer sets I (or equivalently, J in the format described above) and unitary transforms $\Psi$, under the following constraints on the estimate $\hat{h}$: (1) $\hat{c}_j = 0$ for all $j \notin I$, and (2) $E\hat{h}_o = h$ for all $j \in I$.

From (8), the bias of $\hat{h}$ (i.e. the first term in (8)) is given by $$\Delta_\varepsilon^2 = tr\left[(h - E\hat{h})(h - E\hat{h})^H\right]$$

$$= tr[\Psi(c - E\hat{c})(c - E\hat{c})^H \Psi^H]$$

$$= tr[(c - E\hat{c})(c - E\hat{c})^H]$$

$$= \|c\|^2 - c^H(E\hat{c}) - (E\hat{c}^H)c + \|E\hat{c}\|^2$$

$$= \|h\|^2 - \|J^H c\|^2$$

$$= \|h\|^2 - tr[J^H \Psi^H hh^H \Psi J]$$

where the fifth equality follows from the fact that $E\hat{c}=EJJ^H\hat{c}_o=JJ^H(E\hat{c}_o)=JJ^Hc$ since $\hat{c}_o$ is an unbiased estimate of c. By substituting $\hat{h}=\Psi JJ^H\Psi^H\hat{h}_o$ in the second term of (8), the statistical error is obtained as $$\sigma_\varepsilon^2 = tr\left[E(\hat{h} - E\hat{h})(\hat{h} - E\hat{h})^H\right]$$

$$= tr\left[E\Psi JJ^H\Psi^H(\hat{h}_o - E\hat{h}_o)(\hat{h}_o - E\hat{h}_o)^H \Psi JJ^H\Psi^H\right]$$

$$= tr\left[EJ^H\Psi^H(\hat{h}_o - E\hat{h}_o)(\hat{h}_o - E\hat{h}_o)^H\Psi J\right]$$

$$= tr\left[EJ^H\Psi^H(\hat{h}_o - h)(\hat{h}_o - h)^H\Psi J\right]$$

$$\geq tr\left[EJ^H\Psi^H\left(-\frac{\partial^2 \ln p(r|h)}{\partial h^2}\right)^{-1}\Psi J\right]$$

$$= \sigma_w^2 tr\left[J^H\Psi^H(S^HS)^{-1}\Psi J\right]$$

where the fourth equality above follows from the fact that $\hat{h}_o$ is an unbiased estimate of h, and where the inequality follows from the Cramer-Rao bound for general unbiased estimates. This inequality becomes equality when the ordinary LS estimation is used for computing the initial channel estimate. In other words, to minimize the statistical error, one should choose $$\hat{h}_o = (S^HS)^{-1}S^H r, \tag{11}$$

or in other words, $$\hat{h} = \Psi JJ^H\Psi^H\hat{h}_o = \Psi JJ^H\Psi^H(S^HS)^{-1}S^H r. \tag{12}$$

Noting that $\Psi_K=\Psi J$, the proposed estimate shown in (10) is obtained.

Next, a choice for $\Psi$ and J according to some embodiments of the present invention will be described. By summing the contribution from the bias and the statistical error, the overall estimation error becomes $$tr\left[E(h - \hat{h})(h - \hat{h})^H\right] = \Delta_\varepsilon^2 + \sigma_\varepsilon^2 \tag{13}$$

$$= \|h\|^2 - tr\left[J^H\Psi^H(hh^H - \sigma_w^2(S^HS)^{-1})\Psi J\right]$$

$$= \|h\|^2 - \sum_{k=1}^K \varphi_{i_k}^H(hh^H - \sigma_w^2(S^HS)^{-1})\varphi_{i_k}$$

where $\varphi_i$ denotes the i th column of $\Psi$. From (13), it appears that the columns of the best matrix $\Psi$ should be the one with the eigenvectors of the matrix $(hh^H-\sigma_w^2(S^HS)^{-1})$, and a set of integers $\{i_k\}_{k=1}^K$ should be those indices that corresponds to the positive eigenvalues of $(hh^H-\sigma_w^2(S^HS)^{-1})$, where K here represents the number of eigenvalues of $(hh^H-\sigma_w^2(S^HS)^{-1})$ that are positive.

However, since $hh^H$ is not known a priori, one may use $\hat{h}_o\hat{h}_o^H$ as an estimate of $hh^H$, which leads to (b) the transform $(\hat{h}_o\hat{h}_o^H - \sigma_w^2(S^HS)^{-1})$. Alternatively, one may optimize $\Psi$ in a minimax sense (i.e. for the worse channel realization) in the first iteration:

$$\Psi = \arg\min_{\Psi':\Psi^H\Psi=I} \max_{h:\|h\|^2\leq P}\left[\|h\|^2 - \sum_{k=1}^K \varphi_{i_k}^H(hh^H - \sigma_w^2(S^HS)^{-1})\varphi_{i_k}\right] \tag{14}$$

$$= \arg\min_{\Psi':\Psi^H\Psi=I}\left[\sigma_w^2\sum_{k=1}^K \varphi_{i_k}^H(S^HS)^{-1}\varphi_{i_k}\right]$$

where P is any positive constant indicating the maximum strength of the channel response h under consideration. It appears from (14) that the, columns of the transform $\Psi$ should be chosen as the eigenvectors of (b) the matrix $S^HS$, and the set of integers $\{i_k\}_{k=1}^K$ should be those indices corresponding to the largest eigenvalues of $S^HS$. One may also think of this choice of $\Psi$ as designing for the low signal-to-noise situation where $\sigma_w^2$ is large.

Figure 7:
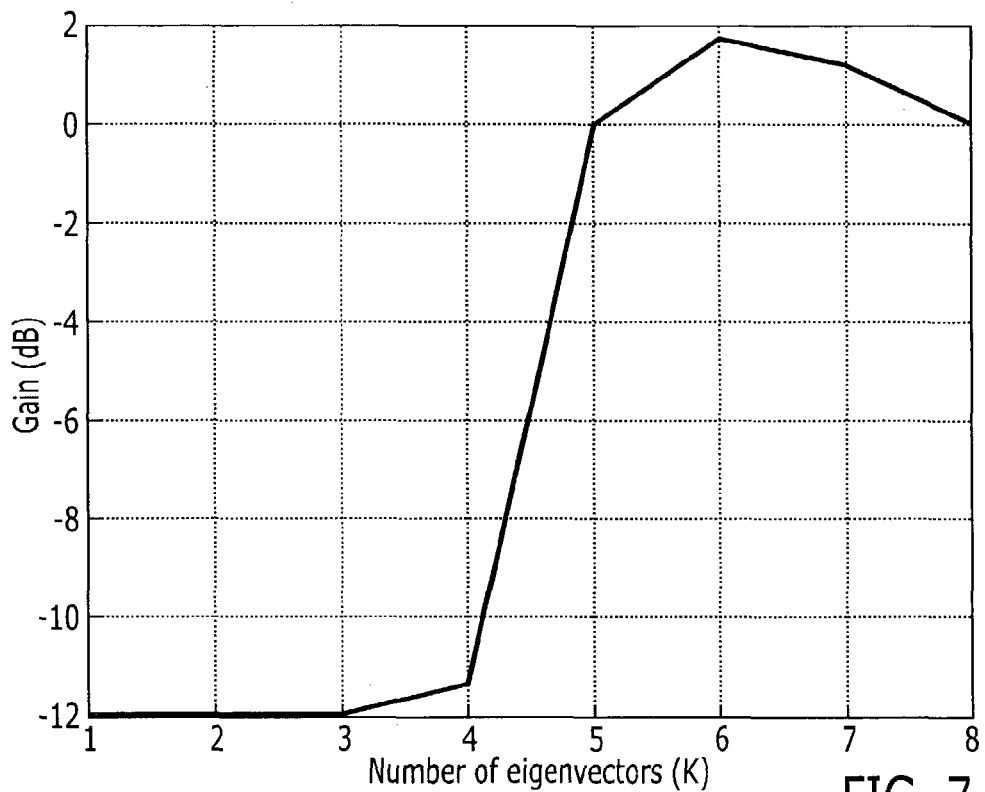
FIGS. 7 and 8 graphically illustrate gains that may be achieved by embodiments of the present invention.

Embodiments of the invention may significantly improve performance of receivers that have a DC offset problem, such as the homodyne receivers typically used for EDGE. FIG. 7 shows the gains that may be achieved by an embodiment of the invention with one iteration, as K varies, in mean-squared estimation error (in dB) over the LS channel estimation, which is also equal to the Cramer-Rao lower bound on any unbiased channel estimation techniques. The eigenvectors of the matrix $S^HS$ are used as the columns of the transform $\Psi$. The GSM training sequence TS5 and a joint estimation of a 7-tap baseband channel and 1-tap DC at an C/N ratio of 10 dB are assumed in this figure, which shows that up to 2 dB gain in mean squared estimation error can be achieved by reducing K from L=8 to 6.

Figure 8:
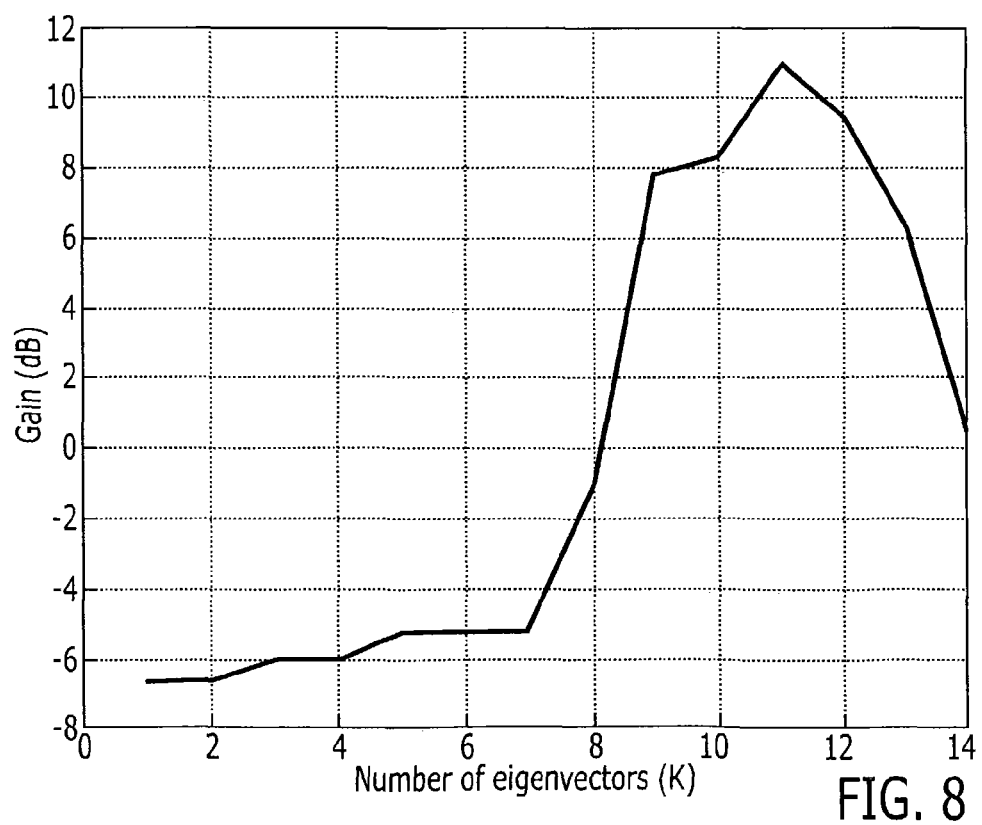

FIG. 8 shows the corresponding gain in mean-squared estimation error in the case of joint channel estimation of two 7-tap channels for transmit diversity. A C/N ratio of 18 dB and the GSM training sequences TS0 and TS5 and are assumed in the figure. It is shown that up to 11 dB in mean-squared channel estimation can be achieved by reducing K from L=14 to 11.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A method of estimating a channel response from training symbols that are received over a channel, the method comprising:
   determining an initial channel estimate only from the training symbols that are received over the channel;
   applying bias to the initial channel estimate to obtain a biased channel estimate; and
   using the biased channel estimate to demodulate a signal that is received over the channel.

2. A method according to claim 1 wherein the applying bias to the initial channel estimate to obtain a biased channel estimate further comprises:
   transforming the initial channel estimate;
   performing an operation on the transformed initial channel estimate; and inverse transforming the transformed initial channel estimate on which the operation was performed, to obtain the biased channel estimate.

3. A method according to claim 2 further comprising:
repeating the transforming the initial channel estimate, the performing an operation on the transformed initial channel estimate and the inverse transforming the transformed initial channel estimate on which the operation was performed, to obtain the biased channel estimate.

4. A method according to claim 1 wherein the applying bias to the initial channel estimate to obtain a biased channel estimate comprises:
transforming the initial channel estimate according to a transform matrix;
setting at least one tap of the transformed initial channel estimate to zero; and
inverse transforming the transformed initial channel estimate with at least one trap set to zero, to obtain the biased channel estimate.

5. A method according to claim 4 further comprising:
repeating the transforming the initial channel estimate according to a transform matrix, the setting at least one tap of the transformed initial channel estimate to zero and the inverse transforming the transformed initial channel estimate with at least one trap set to zero, to obtain the biased channel estimate.

6. A method according to claim 4 wherein the at least one tap is determined by comparing taps of the transformed initial channel estimate to at least one threshold.

7. A method according to claim 4 wherein the at least one tap comprises at least one tap having largest values.

8. A method according to claim 1 wherein the applying bias to the initial channel estimate to obtain a biased channel estimate comprises applying bias to-the initial channel estimate to obtain a biased channel estimate that reduces error in an estimated channel response compared to the initial channel estimate.

9. A method according to claim 1 wherein the applying bias to the initial channel estimate to obtain a biased channel estimate comprises applying bias to the initial channel estimate that reduces errors in the initial channel estimate that are due to non-orthogonality of the training symbols.

10. A method of estimating a channel response, the method comprising:
receiving training symbols that are received over a channel to determine an initial channel estimate;
applying bias to the initial channel estimate to obtain a biased channel estimate that reduces error in an estimated channel response compared to the initial channel estimate; and
using the biased channel estimate to demodulate a signal that is received over the channel.

11. A system for estimating a channel response only from training symbols that are received over a channel, the system comprising:
an initial channel estimating circuit that is configured to determine an initial channel estimate from the training symbols that are received over the channel;
a bias computing circuit that is configured to apply bias to the initial channel estimate to obtain a biased channel estimate; and
a demodulator that is configured to use the biased channel estimate to demodulate a signal that is received over the channel.

12. A system according to claim 11 wherein the bias computing circuit comprises:
a circuit that is configured to transform the initial channel estimate;
a circuit that is configured to perform an operation on the transformed initial channel estimate; and
a circuit that is configured to inverse transform the transformed initial channel estimate on which the operation was performed, to obtain the biased channel estimate.

13. A system according to claim 11 wherein the bias computing circuit comprises:
a circuit that is configured to transform the initial channel estimate according to a transform matrix;
a circuit that is configured to set at least one tap of the transformed initial channel estimate to zero; and
a circuit that is configured to inverse transform the transformed initial channel estimate with at least one trap set to zero, to obtain the biased channel estimate.

14. A system according to claim 13 wherein the at least one tap is determined by comparing taps of the transformed initial channel estimate to at least one threshold.

15. A system according to claim 13 wherein the at least one tap comprises at least one tap having largest values.

16. A system according to claim 11 wherein the bias computing circuit is further configured to apply bias to the initial channel estimate to obtain a biased channel estimate that reduces error in an estimated channel response compared to the initial channel estimate.

17. A system according to claim 11 wherein the bias computing circuit is further configured to apply bias to the initial channel estimate that reduces errors in the initial channel estimate that are due to non-orthogonality of the training symbols.

18. A system for estimating a channel response only from training symbols that are received over a channel, the system comprising:
a receiver circuit configured to receive training symbols over a channel and determine an initial channel estimate; and
a bias computing circuit that is configured to apply bias to the initial channel estimate to obtain a biased channel estimate that reduces error in an estimated channel response compared to the initial channel estimate; and
a demodulator that is configured to use the biased channel estimate to demodulate a signal that is received over the channel.

19. A wireless receiver comprising:
a front end that is configured to receive training symbols over a channel;
an initial channel estimating circuit that is configured to determine an initial channel estimate only from the training symbols that are received over the channel;
a bias computing circuit that is configured to apply bias to the initial channel estimate to obtain a biased channel estimate; and
a demodulator that is configured to use the biased channel estimate to demodulate a signal that is received over the channel.

20. A wireless receiver according to claim 19 wherein the bias computing circuit comprises:
a circuit that is configured to transform the initial channel estimate;
a circuit that is configured to perform an operation on the transformed initial channel estimate; and
a circuit that is configured to inverse transform the transformed initial channel estimate on which the operation was performed, to obtain the biased channel estimate.

21. A wireless receiver according to claim 19 wherein the bias computing circuit comprises:
- a circuit that is configured to transform the initial channel estimate according to a transform matrix;
- a circuit that is configured to set at least one tap of the transformed initial channel estimate to zero; and
- a circuit that is configured to inverse transform the transformed initial channel estimate with at least one trap set to zero, to obtain the biased channel estimate.

22. A wireless receiver according to claim 19 wherein the bias computing circuit is further configured to apply bias to the initial channel estimate to obtain a biased channel estimate that reduces error in an estimated channel response compared to the initial channel estimate.

23. A system according to claim 19 wherein the bias computing circuit is further configured to apply bias to the initial channel estimate that reduces errors in the initial channel estimate that are due to non-orthogonality of the training symbols.

24. A wireless receiver comprising:
- a front end that is configured to receive training symbols over a channel and determine an initial channel estimate;
- a bias computing circuit that is configured to apply bias to the initial channel estimate to obtain a biased channel estimate that reduces error in an estimated channel response compared to the initial channel estimate; and
- a demodulator that is configured to use the biased channel estimate to demodulate a signal that is received over the channel.

* * * * *

UNITED STATES PATENT AND TRADEMARK OFFICE
CERTIFICATE OF CORRECTION

PATENT NO. : 7,623,596 B2  Page 1 of 1
APPLICATION NO. : 10/608274
DATED : November 24, 2009
INVENTOR(S) : Krasny et al.

It is certified that error appears in the above-identified patent and that said Letters Patent is hereby corrected as shown below:

In Column 8, Line 54, delete "l={i$_1$, i$_2$,..., i$_K$}" and insert -- I={i$_1$, i$_2$,..., i$_K$} --, therefor.

In Column 8, Line 56, delete "J(l)" and insert -- J(I) --, therefor.

In Column 10, Line 18, delete "the," and insert -- the --, therefor.

In Column 11, Line 36, in Claim 8, delete "to-the" and insert -- to the --, therefor.

Signed and Sealed this
Eleventh Day of January, 2011

David J. Kappos
*Director of the United States Patent and Trademark Office*